INVENTORS
ELIA A. GALLO.
WILLARD F. MEYERS
BY

ATTORNEY

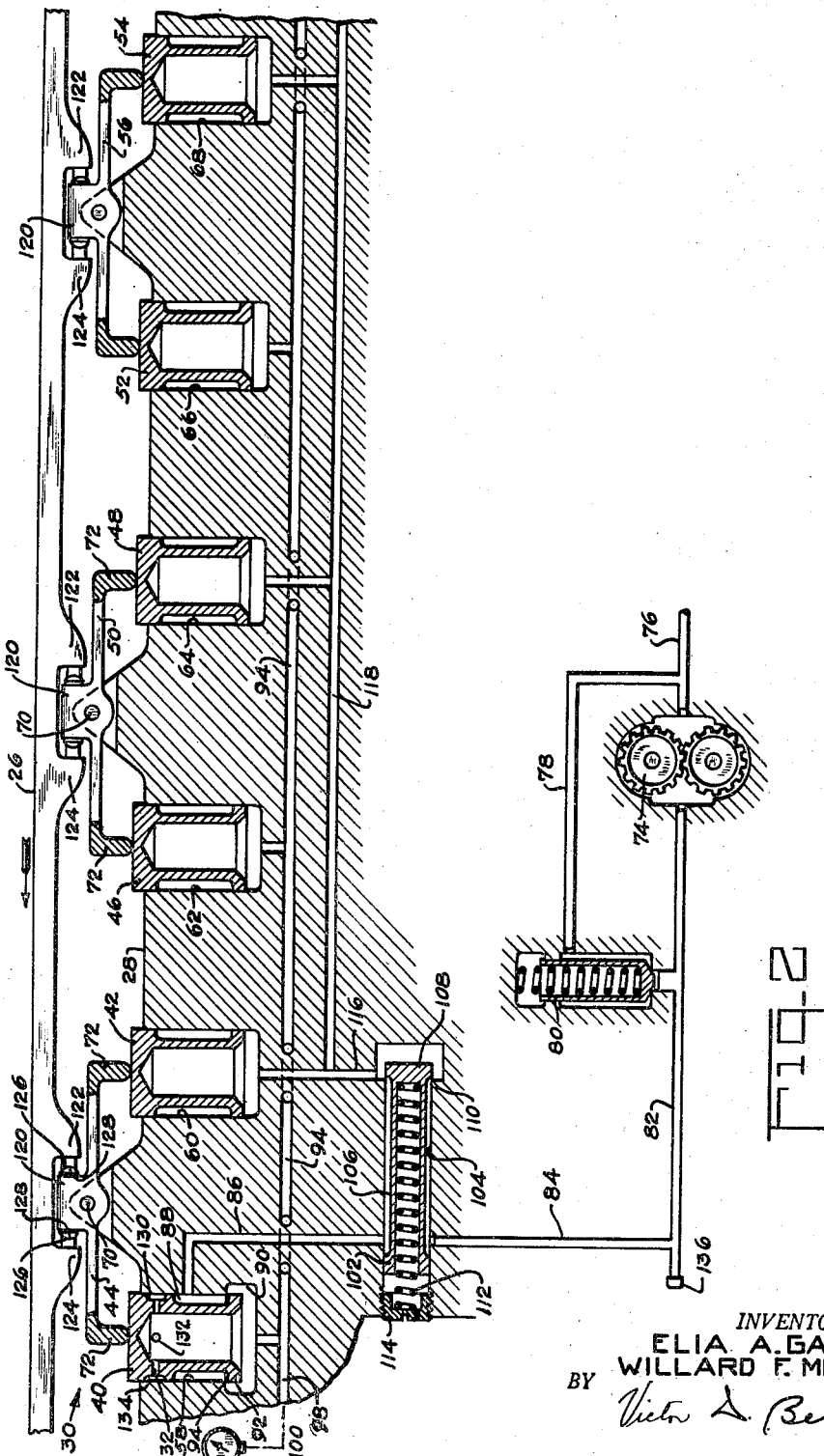

Patented July 31, 1951

2,562,710

UNITED STATES PATENT OFFICE 2,562,710

TORQUE METER

Elia A. Gallo, Englewood, and Willard F. Meyers, Demarest, N. J., assignors to Wright Aeronautical Corporation, a corporation of New York Application October 1, 1949, Serial No. 119,036

11 Claims. (Cl. 73—136)

This invention relates to means for measuring torque and is particularly directed to means for measuring the torque output of an engine in which said means is arranged to measure forward as well as reverse torque and to distinguish between forward and reverse torque.

Aircraft engines are generally provided with torque-meters for measuring their torque output. In addition, automatic power control systems for aircraft engines, particularly of the gas turbine type, generally use the engine torque output as one of the factors controlling engine power. In such an automatic power control system it is desirable that there be a continuous measurement and indication of the engine torque output through zero torque. Accordingly the primary object of this invention comprises the provision of a novel and simple arrangement for measuring the torque output of an engine such that it not only is possible to measure both forward and reverse torque but it is also possible to distinguish between forward and reverse torque. Reverse torque conditions take place when, for example, the aircraft propeller is windmilling and tending to drive the engine.

Other objects of the invention will become apparent upon reading the annexed detailed description in connection with the drawing in which:

Figure 2 is a diagrammatic development taken along line 2—2 of Figure 1 and illustrating the details of the torque measuring system embodying the invention.

Figure 1:
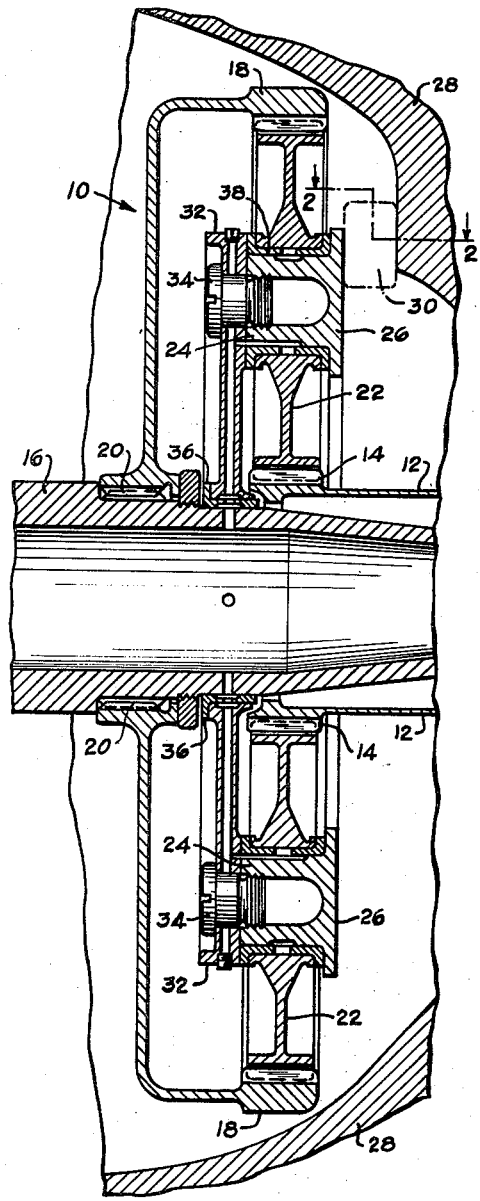
Figure 1 is a schematic view of an engine transmission to which the invention has been applied.

Referring first to Figure 1 of the drawing, there is illustrated a transmission 10 for an aircraft engine, said transmission comprising an input shaft 12 having a gear 14 formed integral therewith and an output shaft 16 having a gear 18 splined thereto as indicated at 20. When the transmission 10 is disposed between an aircraft engine and its propeller, the shaft 12 is connected to said engine and the shaft 16 is connected to said propeller. The gears 14 and 18 are concentric and a plurality of circumferentially spaced pinions 22 are disposed between the gears 14 and 18 in meshing engagement with said gears. The pinions 22 are journaled on studs 24 projecting from an annular member 26. Said annular member is secured against rotation relative to the transmission housing 28 by means schematically indicated at 30 whereby the pinions 22 provide a step-down speed ratio drive from the input shaft 12 to the output shaft 16. Since the pinion carrier member 26 is secured against rotation to the housing 28 said carrier member constitutes the torque reaction member of the transmission 10.

An annular member 32 is secured to the pinion carrier member by screws 34. An oil transfer bushing 36 is disposed between the member 32 and the shaft 16 for transferring lubricating oil to the pinion bearings 38 from the shaft 16. Except for details of the means 30 whereby the reaction member 26 is secured against rotation to the transmission housing 28, the transmission 10 so far described is similar to that illustrated in copending application Serial No. 2,383, filed January 15, 1948, by V. Moore, now Patent No. 2,518,703. As will appear, however, the invention is not limited to the specific form of transmission illustrated but is applicable to any transmission having a torque reaction member subjected to a torque proportional to the torque being transmitted.

Referring now to Figure 2, the means 30 for securing the torque reaction member 26 against rotation to the transmission housing 28 comprises a plurality of pairs of pistons symmetrically spaced about the transmission axis and carried by said housing. Three pairs of pistons have been illustrated, a first pair 40 and 42 interconnected by a lever 44, a second pair 46 and 48 interconnected by a lever 50, and a third pair 52 and 54 interconnected by a lever 56. As will appear, however, it is within the scope of the invention to use only one pair or any number of pairs of said pistons. As in the aforementioned copending application, the axes of the pistons are parallel to the transmission axis. The pistons 40, 42, 46, 48, 52, and 54 are slidable within cylinders 58, 60, 62, 64, 66 and 68 respectively, said cylinders being formed within the transmission housing 28. Each of the levers 44, 50, and 56 is pivotally mounted midway of its ends by a pivot pin 70 carried by the housing 28. The ends of each lever are formed with lateral projections 72 extending into engagement with its adjacent piston. As hereinafter explained liquid under pressure acts against the head of each piston for urging said pistons outwardly into engagement with their respective lever ends 72.

A positive displacement type pump 74, preferably driven from the shaft 12, is supplied with a liquid, such as engine lubricating oil, through a supply conduit 76. A by-pass passage 78, having a spring loaded pressure relief valve 80 is preferably connected around the pump 74 to limit its output pressure. Conduits 82, 84, and 86 provide communication between the output side of the pump 74 and an annular groove 88 formed about the piston 40 intermediate its ends. The head end or bottom of the cylinder 58 for the piston 40 constitutes an increased diameter portion 90 and the head end 92 of the piston 40 is movable past the circular edge 94 formed at the junction of the cylinder 58 with its increased diameter portion 90 to admit liquid under pressure behind the piston 40 from the annular groove 88. From the cylinder head 90 liquid is supplied through an unrestricted conduit 94 to the heads of the cylinders 62 and 66 behind the pistons 46 and 52. The fit of the pistons 46 and 52 in their respective cylinders is such that there is some leakage of oil past these pistons from the piston 40. The pressure of the liquid acting against the pistons 40, 46 and 52 is transmitted by a conduit 98 to a suitable gage 100 and/or to a power control system for the engine.

Oil pressure is supplied behind the pistons 42, 48 and 54 from the pump 74 through a pressure reducing valve 102. The pressure reducing valve 102 is slidably fitted within a bore 104 in the transmission housing 28 and said valve 102 has an annular groove 106 intermediate its ends. The valve groove 106 provides communication between the passages 84 and 86. The bottom of the bore 104 is of increased diameter and the head end 108 of the valve 102 is movable past the bore edge 110 at the junction of the valve bore 104 with its increased diameter portion. A spring 112 urges the valve 102 toward the bottom of its bore 104 and a nut 114 closes the opposite end of said bore, said nut being adjustable to vary the compression of the spring 112. A passage 116 provides communication between the bottom of the valve bore 104 and the head end of the cylinder 60 behind its piston 42. In addition the head ends of the cylinders 64 and 68 are in unrestricted communication with the passage 116 through a passage 118. Accordingly, the reduced output pressure of the valve 102 acts against all of the pistons 42, 48 and 54 to urge said pistons outwardly against their respective lever ends 72.

The fit of the pistons 42, 48 and 54 in their cylinders is such that there is a continual leakage flow of oil past said pistons from the pressure reducing valve 102. With this arrangement, the position of the pressure reducing valve head 108 relative to the metering edge 110 is such that the pressure at the bottom of the valve bore 104, acting against the valve head 108, always balances the force of the spring 112 against said valve. Thus, upon an increase in the output pressure of the pump 74, the oil pressure tends to increase against the valve head 108 but this increase in pressure moves the valve 102 to the left (Figure 2) to further throttle the oil as it flows past the metering edge 110 until the oil pressure against the valve head 108 again balances the force of the spring 112. Any adjustment of the nut 114 varies the compression of the spring 112 thereby varying the magnitude of the reduced output pressure automatically maintained by the valve 102.

Each lever 44, 50 and 56 has a lateral extension 120 projecting between a pair of facing shoulders 122 and 124 on the transmission reaction member 26. Each shoulder 122 and 124 is provided with a concave spherical surface 126 within which a convex spherical button 128 on the associated lever extension 120 fits. With this interconnection of the reaction member 26 with the pistons through the levers 44, 50 and 56, the fluid pressure acting on said pistons restrains rotation of the reaction member relative to the transmission housing 28. The transmission 10 is arranged so that when transmitting torque in its forward or normal direction, that is from the shaft 12 to the shaft 16, the torque on the transmission reaction member 26 urges said member in the direction indicated by the arrow in Figure 2. When reverse torque is transmitted, that is when torque is transmitted from the propeller shaft 16 to the engine shaft 12, as when the propeller is windmilling, the torque on the reaction member is reversed from that indicated by the arrow in Figure 2.

Since the pistons 40, 46 and 52 are interconnected by the passage 94, the same fluid pressure necessarily acts against these pistons and this fluid pressure is controlled by the piston 40. The pistons 42, 48 and 54 are interconnected by the passage 118 so the equal fluid pressures also act against these pistons. This latter fluid pressure, however, is constant and its magnitude is determined by the setting of the pressure reducing valve 102. Because the fluid pressures acting against the pistons 40, 46 and 52 are equal and because the fluid pressures acting against the pistons 42, 48 and 54 are equal, the reaction torque on the member 26 is resisted equally by the pairs of pistons whereby said reaction member exerts an equal force against all of the levers 44, 50 and 56 and said force is proportional to the torque transmitted by the transmission 10.

If, for example, there is an increase in the forward torque transmitted by the transmission 10 then there is an increase in the torque proportional force exerted by the reaction member 26 on the lever 44. The lever 44 thereupon rotates counterclockwise to move the head 92 of the piston 40 inwardly further beyond the edge 94 to such an extent that the pressure acting against the piston 40 increases to rebalance the turning forces acting on the lever 44. In this way the piston 40 is automatically movable relative to the edge 94 to vary the magnitude of the fluid pressure acting against said piston in order to maintain the turning forces acting on the lever 44 balanced. Since each pair of pistons is subjected to the same fluid pressures, when the turning forces on the lever 44 are balanced the corresponding forces on the levers 50 and 56 are also balanced.

Figure 3:
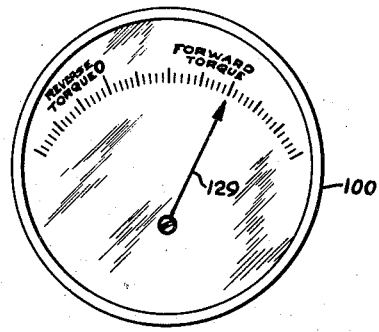
Figure 3 is a view of the torque measuring gage.

When the torque acting on the transmission reaction member 26 is zero, the piston 40 assumes a position, relative to its metering edge 94, such that the pressure behind said piston just balances the pressure behind its associated piston 42. At the same time the pressure behind the pistons 46 and 52 will balance the pressure behind their respective associated pistons 48 and 54. If now the torque increases in a forward direction, the force of the torque reaction member 26 on the lever 44 exerts a counter-clockwise turning moment on said lever 44 which adds to the turning moment exerted on said lever by the piston 42 thereby unbalancing the turning forces on said lever. In response to said unbalance, the piston 40 moves inwardly to increase the opening between its head 92 and the metering edge 94 until the fluid pressure acting against said piston has been increased by an amount proportional to said torque responsive force thereby again balancing the forces on its lever 44. If, however, the torque increases in the reverse direction from its zero value then the force of the reaction member 26 on the lever 44 exerts a clockwise turning moment on said lever thereby unbalancing the turning forces on said lever. In response to this unbalance, the piston 40 moves outwardly until the pressure against said piston has been reduced by an amount proportional to said torque thereby again balancing the forces on the lever 44. It follows therefore that; (1) when the torque being transmitted is zero, the fluid pressure acting against the piston 40 is equal to the constant fluid pressure acting against the piston 42; (2) when forward torque is being transmitted, the fluid pressure acting against the piston 40 is greater than the constant fluid pressure acting against the piston 42 by an amount proportional to said forward torque; and (3) when reverse torque is being transmitted, the fluid pressure acting against the piston 40 is less than the constant fluid pressure acting against the piston 42 by an amount proportional to said reverse torque. Accordingly, the gage 100 is calibrated to read zero torque when the fluid pressure acting on said gage is equal to the output pressure for which the pressure reducing valve 102 is set. Then any increase in the fluid pressure acting on the gage 100, above the value for zero torque, is a measure of the forward torque on the reaction member 26 and any decrease in the fluid pressure acting on said gage, below this zero torque value is a measure of the reverse torque on the reaction member 26. The gage 100 can therefore be graduated as indicated in Figure 3 so that deflection of its pressure responsive needle 129 to one side of its zero point will indicate and be a measure of forward torque while deflection of said needle to the other side of its zero point will indicate and be a measure of reverse torque. The zero point of the gage 100 can readily be fixed as follows: When the engine is shut down, so that the torque transmitted is zero, oil is pumped into the system through a normally closed externtal connection 136 communicating with the passage 84, the pressure of said oil being greater than the output pressure for which the reducing valve 102 is set. The position of the gage needle 129 is then adjusted relative to its scale to read zero.

The magnitude of the output pressure of the pressure reducing valve 102 is such that the turning moment exerted on each lever 44, 50 and 56 by their associated pistons 42, 48, and 54, respectively, is greater than the turning moment exerted on said lever by the reaction member 26 at maximum reverse torque. Therefore the gage 100 will always respond to a positive fluid pressure from a maximum forward torque through zero torque to maximum reverse torque.

In an actual design, the by-pass pressure relief valve 80 of the pump 74 was designed to open at a pressure of approximately 425 pounds per square inch and the pressure reducing valve 102 was designed to maintain a constant pressure of 68 pounds per square inch on the pistons 42, 48 and 54. These numerical values are merely given by way of example since their actual magnitudes obviously depend on the ranges of forward and reverse torque acting on the reaction member 26 as well as on the sizes of the various pistons and on the lengths of the various lever arms.

With the system so far described if the leakage flow path past the pistons 46 and 52 becomes too small, the piston head 92 may not be able to throttle the leakage flow sufficiently at the metering edge 94 to bring the pressure behind the piston 40 down to the value required to balance the forces acting on the lever 44. If this happens, the piston 40 will move outwardly and the lever 44 will rotate clockwise to the limits of their travel whereupon the gage 100 will give a false reading. In addition the pressure behind the piston 40 might become sufficiently high to cause damage, for example, to the lever 40. To prevent this and to maintain the accuracy of the torquemeter, the piston 40 is provided with an annular groove 130 adjacent to its outer end. One or more holes 132 provide communication between said groove and the back side of the piston 40. With this arrangement if, as the piston 40 moves outwardly, it cannot throttle the flow past the metering edge 94 sufficiently to bring the pressure behind said piston down to the value required to balance the forces on its lever 44, then the piston 40 will move outwardly only until its groove 130 sufficiently vents the backside of the piston 40 beyond the forward edge 134 of the piston bore 58 to balance the forces on the lever 44.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with a transmission including a member subjected to a torque proportional to the torque transmitted; a piston; a lever interconnecting said piston and member so that upon transmission of torque said member subjects said lever to a force proportional to the magnitude of said torque, said force urging said lever in a first direction or in a second and opposite rotative direction about the lever pivot axis depending on whether said torque is being transmitted in the forward or in the reverse direction respectively; means for applying a fluid pressure against said piston for subjecting said lever to a force urging said lever in said second direction about its pivot axis; yieldable means for applying a substantially constant force against said lever for urging said lever in said first direction; and means controlled by movements of said piston for varying said fluid pressure to maintain said forces balanced about the lever pivot axis.

2. In combination with a transmission including a member subjected to a torque proportional to the torque transmitted; a piston; a lever interconnecting said piston and member so that upon transmission of torque said member subjects said lever to a force proportional to the magnitude of said torque, said force urging said lever in a first direction or in a second and opposite rotative direction about the lever pivot axis depending on whether said torque is being transmitted in the forward or in the reverse direction respectively; means for applying a fluid pressure against said piston for subjecting said lever to a force urging said lever in said second direction about its pivot axis; yieldable means for applying a substantially constant force against said lever for urging said lever in said first direction; said lever and piston being movable in response to changes in said torque responsive force; and valve means controlled by said lever and piston movements for varying said fluid pressure to maintain said forces balanced about the lever pivot axis.

3. In combination with a transmission including a member subjected to a torque proportional to the torque transmitted; a piston; a lever interconnecting said piston and member so that upon transmission of torque said member subjects said lever to a force proportional to the magnitude of said torque, said force urging said lever in a first direction or in a second and opposite rotative direction about the lever pivot axis depending on whether said torque is being transmitted in the forward or in the reverse direction respectively; means for applying a fluid pressure against said piston for subjecting said lever to a force urging said lever in said second direction about its pivot axis; yieldable means for applying a substantially constant force against said lever for urging said lever in said first direction; and valve means controlled by movements of said piston for varying said fluid pressure to maintain said forces balanced about the lever pivot axis.

4. In combination with a transmission including a member subjected to a torque proportional to the torque transmitted; a piston; a lever interconnecting said piston and member so that upon transmission of torque said member subjects said lever to a force proportional to the magnitude of said torque, said force urging said lever in a first direction or in a second and opposite rotative direction about the lever pivot axis depending on whether said torque is being transmitted in the forward or in the reverse direction respectively; means for providing a source of fluid under pressure communicating with said piston for urging said piston against said lever to subject said lever to a force urging said lever in said second direction; yieldable means for applying a substantially constant force against said lever for urging said lever in said first direction; and a valve port disposed between the head of said piston and said source of fluid under pressure, said piston being movable to open or close said valve port to increase or decrease, respectively, the fluid pressure acting against said piston to maintain said forces balanced about the lever pivot axis.

5. In combination with a transmission including a member subjected to a torque proportional to the torque being transmitted; a first and second piston; a lever interconnecting said pistons and said member so that upon transmission of torque said member subjects said lever to a force proportional to the magnitude of said torque and said force urges said lever in a first or in a second and opposite rotative direction about the lever pivot axis depending on whether said torque is being transmitted in the forward or in the reverse direction respectively; means for applying a constant fluid pressure against said first piston for subjecting said lever to a constant force urging said lever in said first direction about its pivot axis; means for applying a fluid pressure against said second piston for subjecting said lever to a force urging said lever in said second direction about its pivot axis; and means controlled by movements of said piston for varying said fluid pressure to maintain said forces balanced about the lever pivot axis.

6. In the combination recited in claim 5 in which the means for applying a constant fluid pressure includes a pressure reducing valve.

7. In combination with a transmission including a member subjected to a torque proportional to the torque being transmitted; a first and a second piston; a lever interconnecting said pistons and said member so that upon transmission of torque said member subjects said lever to a force proportional to the magnitude of said torque and said force urges said lever in a first or in a second and opposite rotative direction about the lever pivot axis depending on whether said torque is being transmitted in the forward or in the reverse direction respectively; means providing a source of fluid under pressure communicating with said pistons for urging said pistons against said lever, the pressure of said fluid acting against said first piston subjecting said lever to a force urging said lever in said first direction and the pressure of said fluid acting against said second piston subjecting said lever to a force urging said lever in said second direction; a pressure reducing valve for automatically maintaining a constant reduced pressure of said fluid on said first piston; and a valve port varied by movements of said second piston for varying the pressure of said fluid acting against said second piston so as to maintain said forces balanced about the lever pivot axis.

8. In combination with a transmission including a member subjected to a torque proportional to the torque being transmitted; a first and a second piston; a lever interconnecting said pistons and said member so that upon transmission of torque said member subjects said lever to a force proportional to the magnitude of said torque and said force urges said lever in a first or in a second and opposite rotative direction about the lever pivot axis depending on whether said torque is being transmitted in the forward or in the reverse direction respectively; means providing a source of fluid under pressure communicating with said pistons for urging said pistons against said lever, the pressure of said fluid acting against said first piston subjecting said lever to a force urging said lever in said first direction and the pressure of said fluid acting against said second piston subjecting said lever to a force urging said lever in said second direction; a pressure reducing valve for automatically maintaining a constant reduced pressure of said fluid on said first piston; and a valve port disposed between the head of said second piston and said source of fluid, said second piston being movable to open or close said port to increase or decrease, respectively, the fluid pressure acting against said second piston so as to maintain said forces balanced about the lever pivot axis.

9. In the combination recited in claim 8 and including means adapted to vent the fluid pressure acting against said second piston in the event said fluid pressure cannot be reduced sufficiently to balance said forces by movement of said second piston in a direction for closing said valve port.

10. In the combination recited in claim 8 and including a vent port adapted to be opened by said second piston to relieve the fluid pressure acting against the head of said second piston in the event said fluid pressure cannot be reduced sufficiently to balance said forces by movement of said second piston in a direction for closing said valve port.

11. In combination with a transmission including a member subjected to a torque proportional to the torque being transmitted; a plurality of pairs of first and second pistons; a plurality of levers, one for each of said pairs of pistons, each of said levers interconnecting said member and pistons so that upon transmission of torque said member subjects said lever to a force proportional to the magnitude of said torque and said force urges said lever in a first or in a second and opposite rotative direction about the lever pivot axis depending on whether said torque is being transmitted in the forward or in the reverse direction respectively; a source of fluid under pressure communicating with said pistons for urging said pistons against their respective levers, the pressure of said fluid acting against the first piston of each pair of pistons subjecting the associated lever of said first piston to a force urging said lever in said first direction and the pressure of said fluid acting against the second piston of each of said pair of pistons subjecting the associated lever of said first piston to a force urging said lever in said second direction; a pressure reducing valve for automatically maintaining a constant reduced pressure of said fluid against said first pistons; and valve means controlled by movements of at least one of said second pistons for varying the pressure of said fluid acting against said second pistons so as to maintain the forces acting on each said lever balanced about the lever pivot axis.

ELIA A. GALLO.
WILLARD F. MEYERS.

REFERENCES CITED

The following references are of record in the file of this patent:

UNITED STATES PATENTS

| Number | Name | Date |
|---|---|---|
| 924,242 | Kenerson | June 8, 1909 |
| 2,019,755 | Zerbe et al. | Nov. 5, 1935 |
| 2,289,285 | Chilton | July 7, 1942 |
| 2,493,012 | Moore et al. | Jan. 3, 1950 |